United States Patent
Klein

[11] 4,009,945

[45] * Mar. 1, 1977

[54] MICROSCOPE OBJECTIVE

[76] Inventor: Walter Klein, Auf der Hohl 36,, Wissmar, Kreis Wetzlar, Germany

[ * ] Notice: The portion of the term of this patent subsequent to Apr. 30, 1985, has been disclaimed.

[22] Filed: Sept. 1, 1967

[21] Appl. No.: 664,969

Related U.S. Application Data

[63] Continuation-in-part of Ser. No. 306,759, Sept. 5, 1963, Pat. No. 3,380,793.

[52] U.S. Cl. .................................. 350/215; 350/214
[51] Int. Cl. ...................... G02b 21/02; G02b 9/62; G02b 9/64
[58] Field of Search ........... 350/177, 214, 215, 216

[56] References Cited
UNITED STATES PATENTS

| | | | |
|---|---|---|---|
| 1,761,441 | 6/1930 | Foster | 350/215 |
| 2,644,362 | 7/1953 | Ravizza et al. | 350/215 |
| 3,380,793 | 4/1968 | Klein | 350/215 |

*Primary Examiner*—David Schonberg
*Assistant Examiner*—Ronald J. Stern

[57] ABSTRACT

A microscope objective of the strong, dry type wherein the lenses at the object end of the system are particularly small and wherein the curvature of the field is corrected and the image field is flattened by a front lens consisting of a thick meniscus lens is improved to overcome manufacturing and correction difficulties by providing lenses to first widen and then narrow the path of the bundle of rays from the thick meniscus lens and simultaneously to correct aberrations, particularly for large view fields. The objective of this invention is designed for use with medium and high apertures.

2 Claims, 2 Drawing Figures

MICROSCOPE OBJECTIVE

CROSS-REFERENCE TO RELATED APPLICATION

This is a continuation-in-part application of my co-pending application Ser. No. 306,759, filed Sept. 5, 1963, now U.S. Pat. No. 3,380,793.

BACKGROUND OF THE INVENTION

1. Field of the Invention

The invention relates to microscope objectives, and more particularly the type of strong dry objective wherein the curvature of the field is corrected and the image field is flattened by a front lens consisting of a thick meniscus lens.

2. Description of the Prior Art

As is known over a century now, the various defects of an optical system in projecting can, at least partly, be overcome separately by different suitable means. One of such means is a rigidly symmetrical arrangement of all parts of the optical system, such as is the use of the so-called Gauss-type of photo objectives. Another possibility of separately correcting single picture defects was made known by Petzval about the mid-nineteenth century. Certain defects of this type are accumulated in one part of the lenses of the entire system and corrected in the other lenses. In the so-called Petzval objective which consists of two groups of lenses spaced widely apart from each other, the defect in the aperture and the asymmetrical defects of the entire system are corrected through the front lens member. Asymmetrical defects are those which enter the system just by being asymmetrically arranged. According to Petzval, the defects of the image field, e.g. preferably the astigmatism, are corrected through the rear lens. By skilled adaptation of the rear lens it is possible to transfer the diaphragm of the entire system to the front lens. The distance of the diaphragm is thereby reduced to zero for the front lens, with the effect that the shell defect is defined as a solid, invariable value by the contribution of the front lens to the Seidel sums, which defect can be corrected by suitable adaptation of the rear lens.

Further details, for instance, can be gleaned from the monograph of Georg Franke, "PHOTOGRAPHIC OPTIC", published in the Akademischen Verlagsgesellschaft, Frankfurt/Main, 1964, appearing on page 138.

These general techniques as known for the correction of the photo-objective have now been improved and applied to micro-objectives in the present invention.

Microscope objectives of the general type of this invention are shown, for instance, in German Pat. Nos. 821,126, 924,539, and 970,606, and additional objective lenses are provided in these optical systems to correct aberrations the correction of which has been made more difficult by the addition of the thick meniscus front lens.

SUMMARY OF THE INVENTION

In the present application, regarding the microscope objective, the entire optical system has been divided into two groups, one a first lenses group (e.g. lenses 1 to 6 of FIG. 1 of the drawing) at the object end of the system, and a second lenses group (e.g. lenses 7 to 9 of FIG. 1) at the image end of the system. The first group of lenses includes at least two cemented doublet lenses (e.g. lenses 3 to 6 of FIG. 1), and the lenses are all closely spaced from each other. The second group includes, first, a negative lens (e.g. lens 7 of FIG. 1) which is separated by a relatively large air space from the last lens of the first group, and, then, a lens having positive refractive power (e.g. the doublet 8–9 of FIG. 1) which is separated by a relatively large air space from the negative lens. The latter two air spaces have an axial length at least twice the focal length of the objective.

DESCRIPTION OF THE PREFERRED EMBODIMENTS

Figure 1:
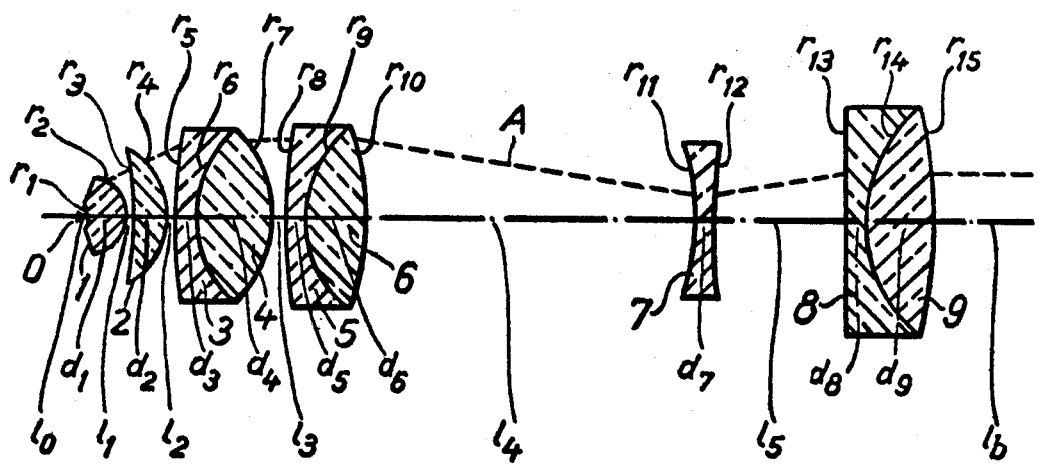
FIG. 1 shows an embodiment having a first group of lenses 1–6 at the object O end of the objective, a negative lens 7 separated from the first group by a relatively large air space $1_4$, and a doublet, lenses 8–9, at the image end. The dashed line A indicates the path followed by a peripheral ray from the object O.

A thick meniscus lens is used advantageously as a first lens in a microscope objective to correct the image field curvature. Other lens members are used adjacent to the thick meniscus lens for correction of the aperture aberrations, the isoplane condition and the chromatic variation of the image. At least two of these members are cemented together. Dependent on the strength of the objective (focal distance and aperture), there are arranged in the objective two or more other lenses. For the correction of the isoplane condition, it is particularly advantageous if the air space between the lenses always is smaller than the axial thickness of the preceding lens. By arranging the lens members very closely to each other, a larger front lens system is obtained than by having greater distances between this portion of the objective.

A microscope objective with a flattened image field should be corrected for large view fields. It is not sufficient for this purpose to correct only the Petzval sum. The image aberrations in the field (at the edge of the view field) particularly astigmatism, chromatic enlargement differences, and coma aberrations, which do not any longer belong to the isoplane conditions must also be very carefully corrected. The thick meniscus as front, or first, lens does not provide correction possibilities for these image errors. On the contrary, this lens enlarges these errors. Furthermore, the lens components behind the front lens are too close to the real objective pupil (focal point on the image side) to have any significant corrective effect on these image errors. On the other hand, these image errors in the field of view can be very advantageously corrected with lens components which are positioned as far as possible from the pupil. There can be obtained with them a very good corrective influence on these field errors without significantly influencing the image errors in the middle of the image. However, even in the correction of these errors, it is advantageous to provide special corrective components. In accordance with the invention, this correction is obtained by the separation of the negative and positive components on the image side by a greater air space. By means of the negative component there is corrected the astigmatism, and by means of the positive component, which is placed the farthest away on the side of the image, there is corrected the coma errors which do not belong any longer to the isoplane condition. Moreover, by providing for two great distances on the side of the image, there can further advantageously be corrected the chromatic enlargement difference. By the introduction of a greater distance between the components on the side of the image, it is possible, in addition to the described correction possibilities, to achieve a control of the pupil disposition (focal point on the image side). This is achieved by corresponding distribution of the refractive power in these components and by the variation of the distances in accordance with the stated ranges.

Thus, in accordance with the claimed arrangement there are provided individual components which are arranged so that all errors of the field may be especially effectively corrected. The individual errors are especially always corrected with particular components without having these components influence significantly the other errors in the image field.

However, with strong objectives (small focal distances and high enlargements) the lenses on the object end of the objective become particularly small. This causes considerable manufacturing and correction difficulties. In the manufacture of such an objective, ways and means must be found whereby the components on the object end do not become unduly small in size, in order not physically to weaken the objective and yet obtain the required corrections. The invention provides means whereby this goal, too, is achieved. In accordance with the invention, lenses are provided in a first group of lenses at the object end of the objective whereby the height of the peripheral ray in the system is increased so that it is, at a minimum, at one place of the object end portion significantly greater than the height of the ray after it passes through the negative and positive lens at the image end of the objective. Preferably, the height of the peripheral ray in the system is at least one and a half times as great as it is at the outer surface of the lenses on the side of the image. By the lens means and distances of the invention, the entire system is provided with a smaller focal length, and therefore the portion of the objective at the object end can be built comparatively larger than formerly. The corrective capacity of the lenses system is meanwhile effectively retained.

It is the primary object of this invention to provide a microscope objective of this type with excellent correction of all aberrations, particularly curvature of the field and astigmatism, as well as extra-axial distortions.

In the objective shown in German Pat. No. 924,539, for instance, a negative lens on the side of the image follows the two additional lenses on the side of the object, the spacing of the negative lens from the preceding lens being more than twice the focal length of the objective and the negative lens being designed primarily to correct the astigmatism of the objective. The advantages of the present invention are accomplished by a modification of this optical system wherein at least two of the additional lenses following the thick meniscus front lens of considerable thickness consist each of two cemented components, and the negative correction lens is split into a negative lens and a positive lens. The negative lens of said correction lens defines a large air space with the last additional lens and the negative and positive lenses of said correction lens define a large air space therebetween, each of the latter two air spaces having an axial length at least twice the focal length of the objective. In this manner, the front lens and the additional lenses constitute the objective portion on the side of the object and the negative and positive lenses constitute the objective portion on the side of the image.

In objectives constructed in accordance with the present invention, it is easy so to control the location of the pupil by the refractive powers of the two lenses on the image side that the focal planes on the image side are at a constant distance from the object in different objectives of a closed series of objectives. This is an important requirement, particularly in top illumination microscopy and in phase-contrast microscopy.

It is known that the first radius of the front lens meniscus becomes very small in strong microscope objectives of the described type. This results in considerable manufacturing difficulties and also makes it quite difficult to clean the front surface of the objective after its use. In an effort to flatten the front face of the front lens as much as possible, it has been proposed to enlarge the lenses in the objective portion on the side of the object, particularly the front lens, by widening the path of the bundle of rays. This widening may be effected in the microscope objectives of this invention by suitably proportioning the negative lens on the side of the image in such a manner that the objective portion on the side of the object projects the peripheral ray of the bundle of rays emanating from the center of the object at least at one point thereof at a distance from the optical axis at least one and a half times the distance of this peripheral ray from the optical axis at the exit surface of the objective portion on the side of the image.

Figure 2:
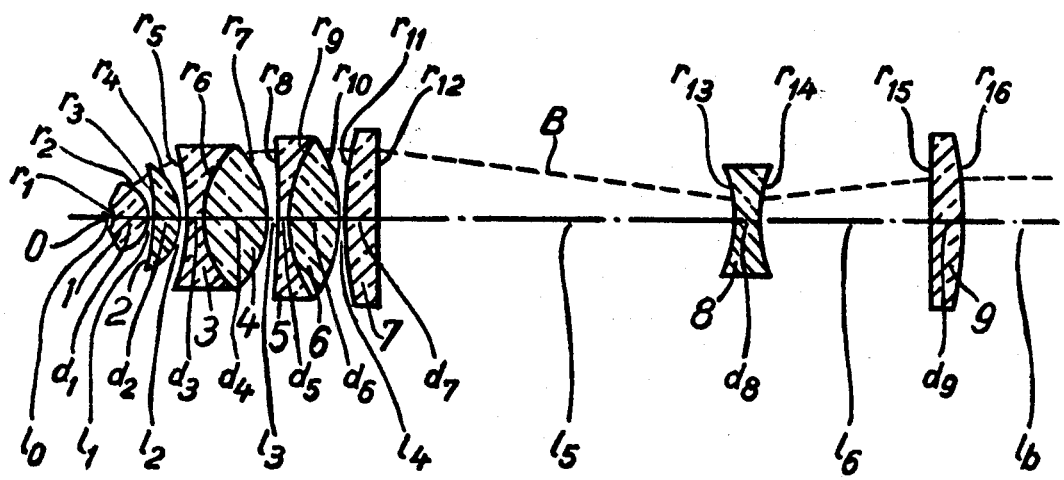
FIG. 2 shows another embodiment having a first group of lenses 1–7 at the object O end of the objective, a negative lens 8 separated from the first group by a distance $1_5$, and a single positive lens 9. The dashed line B indicates the path followed by a peripheral ray from the object O. In each figure, surfaces at $r_6$ and $r_9$ are cemented surfaces of cemented doublet lenses 3–4 and 5–6, respectively. The dashed lines indicate how the peripheral ray is first widened and then narrowed in accordance with the invention.

FIGS. 1 and 2 of the accompanying drawing show two preferred embodiments of the microscope objective of this invention.

In FIG. 1, the microscope objective comprises a first group of lenses which consists of the following lenses, viewed in order from an object O toward the image:

1, a single thick meniscus lens having a thickness $d_1$ and having a surface with a negative radius $r_1$ facing the object end of the objective and a surface with a negative radius $r_2$ facing the image end of the objective and possessing a positive refractive power;

2, a single thin lens having a thickness $d_2$ and having a surface with a negative radius $r_3$ facing the object and a surface with a negative radius $r_4$ facing the image end;

3 to 4, a first cemented doublet of lenses of which lens 3 has a thickness $d_3$ and has a surface having a negative radius $r_5$ facing the object and an opposite, image side, surface having a positive radius $r_6$ and of which lens 4 has a thickness $d_4$ and has a surface fitting and cemented against said image side of lens 3 and has an opposite surface having a negative radius $r_7$ facing the image end;

5 to 6, a second cemented doublet of lenses of which lens 5 has a thickness $d_5$ and has a surface having a positive radius $r_8$ facing the object and an opposite, image side, surface having a positive radius $r_9$ and of which lens 6 has a thickness $d_6$ and has a surface fitting and cemented against said image side of lens 5 and has an opposite surface having a negative radius $r_{10}$ facing the image end;
and which further comprises negative and positive lenses consisting of:

7, a negative lens having a thickness $d_7$ and which has a surface having a negative radius $r_{11}$ facing the object end and an opposite, image side, surface having a positive radius $r_{12}$; and 8–9, a doublet of lenses having positive refractive power, of which lens 8 has a thickness $d_8$ and has a surface having an infinite radius $r_{13}$ facing the object end and an opposite, image side, surface having a positive radius $r_{14}$ and of which lens 9 has a surface fitting against said image side of lens 8 and has a thickness $d_9$ facing the image end, all said radii being radii of curvature.

Cementing is carried out by methods and means well known in the art. See, for example, Jacobs, "FUNDAMENTALS OF OPTICS ENGINEERING", McGraw-Hill Book Company, New York, 1943, page 109.

Lens 1 is separated from the object O by a distance $l_o$. Lenses 1 and 2 are separated from each other by the distance $l_1$. Lenses 2 and 3 are separated by a distance $l_2$. Lenses 4 and 5 are separated by a distance $l_3$. Lenses 6 and 7 are separated by a distance $l_4$. Lenses 7 and 8 are separated by a distance $l_5$. Lens 9 is separated from the image by a distance $l_b$.

In FIG. 2, the microscope objective comprises a first group of lenses which consists of the following lenses, viewed in order from an object O toward the image:

1, a single thick meniscus lens having a thickness $d_1$ and having a surface with a negative radius $r_1$ facing the object end of the objective and a surface with a negative radius $r_2$ facing the image end of the objective and possessing a positive refractive power;

2, a single thin lens having a thickness $d_2$ and having a surface with a negative radius $r_3$ facing the object and a surface with a negative radius $r_4$ facing the image end;

3 to 4, a first cemented doublet of lenses of which lens 3 has a thickness $d_3$ and has a surface having a negative radius $r_5$ facing the object and an opposite, image side, surface having a positive radius $r_6$ and of which lens 4 has a thickness $d_4$ and has a surface fitting and cemented against said image side of lens 3 and has an opposite surface having a negative radius $r_7$ facing the image end;

5 to 6, a second cemented doublet of lenses of which lens 5 has a thickness $d_5$ and has a surface having a negative radius $r_8$ facing the object and an opposite, image side, surface having a positive radius $r_9$ and of which lens 6 has a thickness $d_6$ and has a surface fitting and cemented against said image side of lens 5 and has an opposite surface having a negative radius $r_{10}$ facing the image end;

7, a single lens having a thickness $d_7$ and having a surface with a positive radius $r_{11}$ facing the object and a surface having a positive surface $r_{12}$ facing the image end;

and which further comprises negative and positive lenses consisting of:

8, a negative lens having a thickness $d_8$ and which has a surface having a negative radius $r_{13}$ facing the object end and an opposite, image side, surface having a positive radius $r_{14}$; and 9, a single lens having a positive refractive power and having a thickness $d_9$ and which has a surface having a positive radius $r_{15}$ facing the object end and an opposite, image side, surface having a negative radius $r_{16}$, all said radii being radii of curvature.

Lens 1 is separated from the object O by a distance $l_o$. Lenses 1 and 2 are separated from each other by the distance $l_1$. Lenses 2 and 3 are separated by a distance $l_2$. Lenses 4 and 5 are separated by a distance $l_3$. Lenses 6 and 7 are separated by a distance $l_4$. Lenses 7 and 8 are separated by a distance $l_5$. Lenses 8 and 9 are separated by a distance $l_6$. Lens 9 is separated from the image by a distance $l_b$.

The following Tables I and II give the parameters of the preferred embodiments. Table I corresponds to FIG. 1 and Table II corresponds to FIG. 2. In the tables, the letters $r$ designate the successive first and second radii, taken in the direction from the glass stage supporting the object O to the image, of the lenses or their components, $d$ designate the successive axial thicknesses of the lenses of their components, $l$ designate the axial lengths of the air spaces between the lenses as well as between the object and the front lens, and the last lens and the image, respectively, $n_e$ is the refractive index of the lens or lens component glasses, taken on the $e$-line, $v_e$ is the Abbe number of these glasses, $f_e$ is the focal length of the entire optical system, A is the aperture, and V is the magnification of the microscope:

TABLE I d: Axial thickness of lenses
l: Axial length of air spaces

| Radii | | | | $n_e$ | $v_e$ | Lens |
|---|---|---|---|---|---|---|
| | | $l_o =$ | 0.3337 | | | |
| $r_1 = -$ | 1.14 | | | | | |
| | | $d_1 =$ | 2.26 | 1.69400 | 54.6 | 1 |
| $r_2 = -$ | 1.885 | | | | | |
| | | $l_1 =$ | 0.1 | | | |
| $r_3 = -$ | 14.79 | | | | | |
| | | $d_2 =$ | 1.92 | 1.48772 | 81.6 | 2 |
| $r_4 = -$ | 3.701 | | | | | |
| | | $l_2 =$ | 0.4 | | | |
| $r_5 = -$ | 319.38 | | | | | |
| | | $d_3 =$ | 1.0 | 1.67764 | 32.0 | 3 |
| $r_6 = +$ | 5.95 | | | | | |
| | | $d_4 =$ | 4.15 | 1.48772 | 81.6 | 4 |
| $r_7 = -$ | 6.3 | | | | | |
| | | $l_3 =$ | 2.1 | | | |
| $r_8 = +$ | 64.735 | | | | | |
| | | $d_5 =$ | 1.0 | 1.61771 | 50.8 | 5 |
| $r_9 = +$ | 5.54 | | | | | |
| | | $d_6 =$ | 3.2 | 1.48772 | 81.6 | 6 |
| $r_{10} = -$ | 13.164 | | | | | |
| | | $l_4 =$ | 16.0 | | | |
| $r_{11} = -$ | 11.077 | | | | | |

TABLE I-continued d: Axial thickness of lenses
l: Axial length of air spaces

| Radii | | | | | | $n_e$ | $v_e$ | Lens |
|---|---|---|---|---|---|---|---|---|
| $r_{12}$ | = + | 80.49 | $d_7$ | = | 1.0 | 1.51000 | 60.9 | 7 |
| $r_{13}$ | = | ∞ | $l_5$ | = | 7.3 | | | |
| $r_{14}$ | = + | 8.024 | $d_8$ | = | 1.0 | 1.59167 | 52.9 | 8 |
| $r_{15}$ | = − | 23.79 | $d_9$ | = | 3.5 | 1.53604 | 51.4 | 9 |
| | | | $l_6$ | = | ∞ | | | |
| | | | $f_e$ | = | 3.1065 | | | |
| | | | V | = | 80.48 | | | |
| | | | A | = | 0.95 | | | |

TABLE II d: Axial thickness of lenses
l: Axial length of air spaces

| Radii | | | | | | $n_e$ | $v_e$ | Lens |
|---|---|---|---|---|---|---|---|---|
| | | | $l_o$ | = | 0.31295 | | | |
| $r_1$ | = − | 1.24 | $d_1$ | = | 1.79 | 1.69400 | 54.6 | 1 |
| $r_2$ | = − | 1.619 | $l_1$ | = | 0.13 | | | |
| $r_3$ | = − | 9.331 | $d_2$ | = | 1.5 | 1.43496 | 94.8 | 2 |
| $r_4$ | = − | 2.81 | $l_2$ | = | 0.26 | | | |
| $r_5$ | = − | 11.191 | $d_3$ | = | 0.7 | 1.52520 | 50.9 | 3 |
| $r_6$ | = + | 4.88 | $d_4$ | = | 3.45 | 1.43496 | 94.8 | 4 |
| $r_7$ | = − | 4.88 | $l_3$ | = | 0.25 | | | |
| $r_8$ | = − | 450.17 | $d_5$ | = | 0.7 | 1.75458 | 34.8 | 5 |
| $r_9$ | = + | 7.48 | $d_6$ | = | 2.5 | 1.43496 | 94.8 | 6 |
| $r_{10}$ | = − | 7.48 | $l_4$ | = | 0.2 | | | |
| $r_{11}$ | = + | 17.003 | $d_7$ | = | 1.7 | 1.73944 | 40.8 | 7 |
| $r_{12}$ | = + | 191.961 | $l_5$ | = | 19.9 | | | |
| $r_{13}$ | = − | 6.26 | $d_8$ | = | 1.5 | 1.73431 | 28.4 | 8 |
| $r_{14}$ | = + | 8.97 | $l_6$ | = | 9.0 | | | |
| $r_{15}$ | = + | 211.32 | $d_9$ | = | 1.5 | 1.69416 | 30.9 | 9 |
| $r_{16}$ | = − | 19.69 | $l_8$ | = | ∞ | | | |
| | | | $f_e$ | = | 1.5799 | | | |
| | | | V | = | 158.24 | | | |
| | | | A | = | 0.95 | | | |

Computation and experiment have established that constructional data for the best forms of microscope objectives of the embodiment of Table I and of FIG. 1 preferably should lie within the ranges of values stated in the following statement of inequalities which relates (a) to all of the lens surfaces $r_1$ to $r_{15}$, naming said radii r in order from the front or object side of the objective along the optical axis from the object O, (b) the axial thicknesses d of the lenses $d_1$ to $d_9$, (c) refractive indexes $n_e$ of the glasses of lenses 1 to 9, and (d) the Abbe number $v_e$ of the glasses of lenses 1 to 9:

(a) Ranges of radii r:

| 0,3 f | $<-r_1<$ | 0,5 f | | 1,4 f | $<r_9<$ | 3,0 f |
|---|---|---|---|---|---|---|
| 0,5 f | $<-r_2<$ | 0,8 f | | 3 f | $<-r_{10}<$ | 6 f |
| 3 f | $<-r_3<$ | 7 f | | 2,5 f | $<-r_{11}<$ | 5 f |
| 0,9 f | $<-r_4<$ | 1,5 f | | 20 f | $<r_{12}<$ | 50 f |
| 20 f | $<-r_5<$ | ∞ | | 30 f | $<r_{13}<$ | −30 f |
| 1,5 f | $<r_6<$ | 2,5 f | | 2,5 f | $<r_{14}<$ | 4,5 f |
| 1,5 f | $<-r_7<$ | 3 f | | 6 f | $<-r_{15}<$ | 10 f |
| 15 f | $<r_8<$ | 30 f | | | | |

(b) Ranges of Axial thicknesses d of lenses:

| Lens | | | | Lens | | | | |
|---|---|---|---|---|---|---|---|---|
| 1 | 0,5 f | $<d_1<$ | f | 6 | 0,8 f | $<d_6<$ | 1,8 | f |
| 2 | 0,5 f | $<d_2<$ | 0,9 f | 7 | 0,2 f | $<d_7<$ | 0,6 | f |
| 3 | 0,2 f | $<d_3<$ | 0,6 f | 8 | 0,2 f | $<d_8<$ | 0,6 | f |
| 4 | 0,8 f | $<d_4<$ | 2 f | 9 | 0,8 f | $<d_9<$ | 2 | f |

-continued

| | | | | | | | |
|---|---|---|---|---|---|---|---|
| 5 | 0,2 f | $<d_5<$ | 0,6 f | | | | |

(c) Ranges of refractive indices $n_e$ of lenses:

| Lens | | | | Lens | | | |
|---|---|---|---|---|---|---|---|
| 1 | 1,60 | $<n_e<$ | 1,80 | 6 | 1,43 | $<n_e<$ | 1,53 |
| 2 | 1,43 | $<n_e<$ | 1,53 | 7 | 1,45 | $<n_e<$ | 1,57 |
| 3 | 1,60 | $<n_e<$ | 1,75 | 8 | 1,50 | $<n_e<$ | 1,70 |
| 4 | 1,43 | $<n_e<$ | 1,53 | 9 | 1,46 | $<n_e<$ | 1,60 |
| 5 | 1,55 | $<n_e<$ | 1,70 | | | | |

(d) Abbe number $v_e$ of lenses:

| Lens | | | | Lens | | | |
|---|---|---|---|---|---|---|---|
| 1 | 45 | $<v_e<$ | 65 | 6 | 70 | $<v_e<$ | 95 |
| 2 | 70 | $<v_e<$ | 95 | 7 | 50 | $<v_e<$ | 70 |
| 3 | 25 | $<v_e<$ | 40 | 8 | 45 | $<v_e<$ | 60 |
| 4 | 70 | $<v_e<$ | 95 | 9 | 45 | $<v_e<$ | 60. |
| 5 | 40 | $<v_e<$ | 60 | | | | |

Similarly, computation and experiment have established that constructional data for the best forms of microscope objectives of the embodiment of Table II and of FIG. 2 preferably should lie within the ranges of values stated in the following statement of inequalities which relates (a) to all of the lens surfaces $r_1$ to $r_{16}$, naming said radii r in order from the front or object side of the objective along the optical axis from the object O, (b) the axial thicknesses d of the lenses $d_1$ to $d_9$, (c) refractive indexes $n_e$ of the glasses of lenses 1 to 9 (based on the e line), and (d) the Abbe number $v_e$ of the glasses of lenses 1 to 9:

fractive power is positive in each lens. Thus, in each Table, it is shown that $r_1$, the concave side of lens l is smaller than $r_2$, the convex side of the lens.

The data in the embodiments of the Tables show that the advantages provided by the invention as discussed above are satisfactorily obtained. The surface $r_6$ of the first cemented doublet lenses is effective to correct the coma of the inner or near-axial rays received from the object by the objective. The surface $r_9$ of the second cemented doublet lenses is effective to correct the coma of the outer or off-axial rays received from the object by the objective. The cemented doublet lenses (a) Ranges of radii r:

| | | | | | | |
|---|---|---|---|---|---|---|
| 0,6 f | $<-r_1<$ | f | 4 f | $<r_9<$ | 6 f | |
| 0,8 f | $<-R_2<$ | 1,3 f | 4 f | $<-r_{10}<$ | 6 f | |
| 5 f | $<-r_3<$ | 7 f | 9 f | $<r_{11}<$ | 12 f | |
| 1,4 f | $<-r_4<$ | 2,2 f | 50 | $<r_{12}<$ | ∞ | |
| 6 f | $<-r_5<$ | 10 f | 3 f | $<-r_{13}<$ | 5 f | |
| 2,5 f | $<r_6<$ | 4 f | 5 f | $<r_{14}<$ | 8 f | |
| 2,5 f | $<-r_7<$ | 4 f | 50 f | $<r_{15}<$ | ∞ | |
| 100 f | $<-r_8<$ | ∞ | 10 f | $<r_{16}<$ | 16 f | |

(b) Ranges of Axial thicknesses d of lenses:

| Lens | | | | Lens | | | |
|---|---|---|---|---|---|---|---|
| 1 | f | $<d_1<$ | 1,4 f | 6 | 1,2 f | $<d_6<$ | 2,2 f |
| 2 | 0,8 f | $<d_2<$ | 1,2 f | 7 | 0,9 f | $<d_7<$ | 1,7 f |
| 3 | 0,3 f | $<d_3<$ | 0,7 f | 8 | 0,8 f | $<d_8<$ | 1,5 f |
| 4 | 1,5 f | $<d_4<$ | 3,0 f | 9 | 0,8 f | $<d_9<$ | 1,5 f |
| 5 | 0,3 f | $<d_5<$ | 0,7 f | | | | |

(c) Ranges of refractive indices $n_e$ of lenses:

| Lens | | | | Lens | | | |
|---|---|---|---|---|---|---|---|
| 1 | 1,60 | $<n_e<$ | 1,80 | 6 | 1,42 | $<n_e<$ | 1,50 |
| 2 | 1,42 | $<n_e<$ | 1,50 | 7 | 1,65 | $<n_e<$ | 1,80 |
| 3 | 1,45 | $<n_e<$ | 1,60 | 8 | 1,65 | $<n_e<$ | 1,80 |
| 4 | 1,42 | $<n_e<$ | 1,50 | 9 | 1,60 | $<n_e<$ | 1,80 |
| 5 | 1,65 | $<n_e<$ | 1,85 | | | | |

(d) Abbe number $v_e$ of lenses:

| Lens | | | | Lens | | | |
|---|---|---|---|---|---|---|---|
| 1 | 45 | $<v_e<$ | 65 | 6 | 80 | $<v_e<$ | 100 |
| 2 | 80 | $<v_e<$ | 100 | 7 | 30 | $<v_e<$ | 50 |
| 3 | 40 | $<v_e<$ | 60 | 8 | 25 | $<v_e<$ | 35 |
| 4 | 80 | $<v_e<$ | 100 | 9 | 26 | $<v_e<$ | 40 |
| 5 | 30 | $<v_e<$ | 42 | | | | |

A "thick negative meniscus" lens is one having a dispersing surface which is more strongly curved than its converging surface and the axial thickness of the lens is greater than one half the radius of the dispersing surface. It has a relatively great negative or also positive focal length according to its thickness. Because of its great axial thickness such a meniscus possesses a positive refractive power though it is shaped as a negative meniscus. As is shown in Tables I and II, the axial thickness $d_1$ is considerably greater than the corresponding curved radii $r_1$ and $r_2$ of both surfaces in contact with the meniscus in each system, and the reare each composed of a biconvex element and a biconcave element having refractive indexes and curvatures thereof and of the cemented surfaces such that relatively great color correction and relatively little refraction takes place at the first cemented doublet, and such that relatively little color correction and relatively great refraction take place at the second cemented doublet.

I claim:

1. In a microscope objective, the improved optical system which consists of two groups of lenses a first group of positive lenses positioned on the side of the object, and a second group of lenses positioned on the side of the image, the first group of lenses consisting, in the following order, of a thick negative meniscus front lens concave towards the object, said lens being effective to correct the image field curvature and positioned adjacent the object, a meniscus lens concave towards the object and having an axial thickness smaller than that of the preceding lens, both said lenses having positive refractive power, a first cemented doublet of a concavo-convex lens element, the concave side facing the object, the element being fitted to a biconvex lens on the convex side facing the object, a second cemented doublet of a concavo-convex lens element, the concave side facing the object, the element being fitted to a biconvex lens on the convex side facing the object, the second group of lenses consisting of two lenses, a biconvex negative lens positioned at an axial distance at least twice the focal length of the objective from the second doublet of the first group of lenses and a cemented doublet of a plano-concave lens element fitted to a biconvex lens element, the lenses of the first group of lenses being effective to correct the aperture aberrations and the chromatic variation of the image and being positioned from each other at an axial distance smaller than the axial thickness of the preceding lens for correction of the isoplane condition, the biconvex negative lens and the doublet of the second group of lenses being positioned at an axial distance from each other at least twice the focal length of the objective.

2. In a microscope objective, the improved optical system which consists of two groups of lenses a first group of positive lenses positioned on the side of the object, and a second group of lenses positioned on the side of the image, the first group of lenses consisting, in the following order, of a thick negative meniscus front lens concave towards the object and positioned adjacent the object, a meniscus lens concave towards the object, and having an axial thickness smaller than that of the preceding lens, both said lenses having positive refractive power, a first cemented doublet of a biconcave lens element fitted to a biconvex lens element, a second cemented doublet of a biconcave lens element fitted to a biconvex lens element, a converging meniscus whose convex side faces the object, the second group of lenses consisting of two lenses, a biconvex negative lens positioned at an axial distance at least twice the focal length of the objective from the meniscus of the first group of lenses and a converging meniscus whose convex side faces the image, the lenses of the first group of lenses being effective to correct the apperture aberrations and the chromatic variations of the image being positioned from each other at an axial distance smaller than the axial thickness of the preceding lens for correction of the implane condition, the biconvex negative lens and the converging meniscus of the second group of lenses being positioned at an axial distance from each other at least twice the focal length of the objective.

* * * * *